United States Patent [19]
Schroeder, Sr.

[11] 3,746,317
[45] July 17, 1973

[54] DOUGH KNEADING APPARATUS AND METHOD OF PRODUCING BAKED PRODUCTS

[75] Inventor: Peter H. Schroeder, Sr., Thief River Falls, Minn.

[73] Assignee: Thorough-Bread Industries, Limited, Toronto, Ontario, Canada

[22] Filed: Apr. 7, 1971

[21] Appl. No.: 132,045

[52] U.S. Cl. .............................. 259/185, 259/110
[51] Int. Cl. ................................. B01f 7/02
[58] Field of Search ................. 259/185, 186, 9, 259/10, 109, 110

[56] References Cited
UNITED STATES PATENTS

| | | |
|---|---|---|
| 3,169,753 | 2/1965 | Wegh .............................. 259/110 |
| 743,090 | 11/1903 | Koelner .......................... 259/109 |
| 905,148 | 12/1908 | Collins ............................ 259/110 |
| 946,300 | 1/1910 | Wilson ............................ 259/109 |
| 2,059,604 | 11/1936 | Phelan ........................... 259/110 |
| 3,659,827 | 5/1972 | Fogt ............................... 259/10 |

Primary Examiner—Robert W. Jenkins
Attorney—Merchant & Gould

[57] ABSTRACT

A kneading machine having an eccentrically mounted horizontal bar affixed to a motor for rotation and positioned in a resilient mixing bowl to provide a kneading, rather than mixing, action. The resilient bowl allows and aids the kneading action as the horizontal bar rotates eccentrically within the bowl.

4 Claims, 6 Drawing Figures

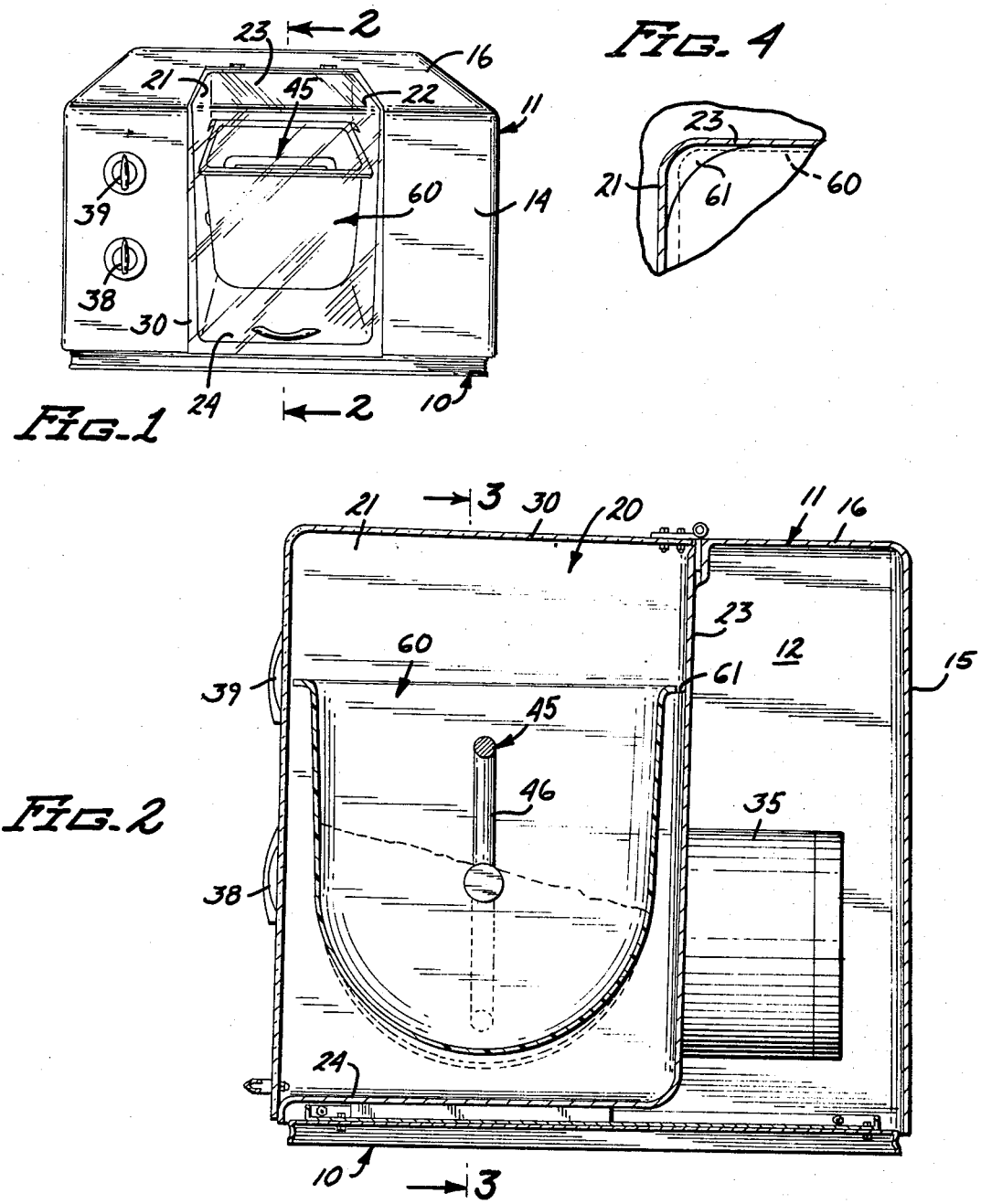

INVENTOR.
PETER H. SCHROEDER SR.
BY Merchant & Gould
ATTORNEYS

DOUGH KNEADING APPARATUS AND METHOD OF PRODUCING BAKED PRODUCTS

BACKGROUND OF THE INVENTION

1. Field of the Invention

In the commercial production of baked goods, and especially breads, the mixing of the ingredients to produce dough is an essential part of the procedure and determines the quality, consistency and other characteristics of the final product. For example, breads produced commercially generally have a very fine texture, with a large overall quantity of air mixed therein, providing a characteristic taste peculiar to commercial bread with the ingredients homogeneously mixed. As opposed to commercial bread, home-made bread, or bread made by hand in two or three loaf quantities, is much coarser with less air therein and generally a much preferred taste. The present invention pertains to a method of producing home-made bread on a commercial scale and apparatus utilized in the production thereof.

2. Description of the Prior Art

In the prior art, commercial bread is produced from dough mixed in large upright mixers, similar to egg-beaters. Because the industry utilizes the large upright beaters, the ingredients utilized are relatively thin and are beat at relatively high speeds so that large amounts of air are incorporated in the dough and the dough is extremely homogeneous. These features provide the characteristic taste described above.

In Canadian Patent No. 489,186, a mixer for making dough is described wherein a U-shaped crank-like beater is rotated about a horizontal axis to provide a kneading affect. This device was designed specifically for use in the home to produce home-made style bread for a family. Further, a solid or metal mixing bowl is utilized in this device so that the net result is a mixing action rather than a kneading action so that the results, while somewhat better than the commercial mixers, is still inferior to home-made or manually made bread.

SUMMARY OF THE INVENTION

The present invention pertains to a method of making improved bread and to an improved dough kneading apparatus including a kneading element having at least one generally horizontally extending rod mounted for eccentric rotation within a resilient mixing bowl having a generally semi-cylindrically shaped bottom with said kneading element being removably connected to a motor for rotation thereof.

It is an object of the present invention to provide an improved dough kneading apparatus.

It is a further object of the present invention to provide an improved method of making bread commercially.

It is a further object of the present invention to provide an improved dough kneading apparatus incorporating a resilient mixing bowl in combination with an eccentrically mounted kneading element to simulate manual kneading of the dough.

These and other objects of this invention will become apparent to those skilled in the art upon consideration of the accompanying specification, claims and drawings.

BRIEF DESCRIPTION OF THE DRAWINGS

Referring to the drawings, wherein like characters indicate like parts throughout the figures:

FIG. 1 is a view in front elevation of an embodiment of the improved dough kneading apparatus;

FIG. 2 is an enlarged cross-sectional view as seen from the line 2—2 in FIG. 1;

FIG. 4 is a view as seen generally from the line 4—4 in FIG. 3;

FIG. 5 is an enlarged fragmentary view of the device connecting the kneading element to the output shaft of the motor.

DESCRIPTION OF THE PREFERRED EMBODIMENT

Figure 3:
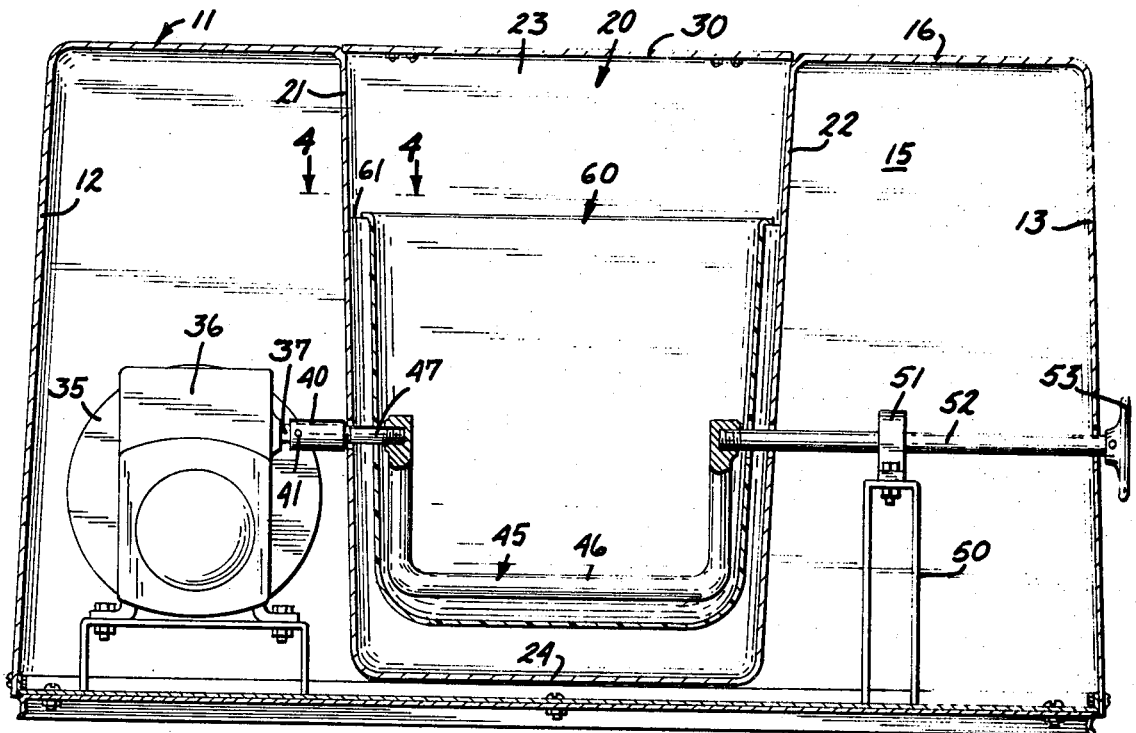
FIG. 3 is a cross-sectional view as seen from the line 3—3 in FIG. 2.
Figure 6:
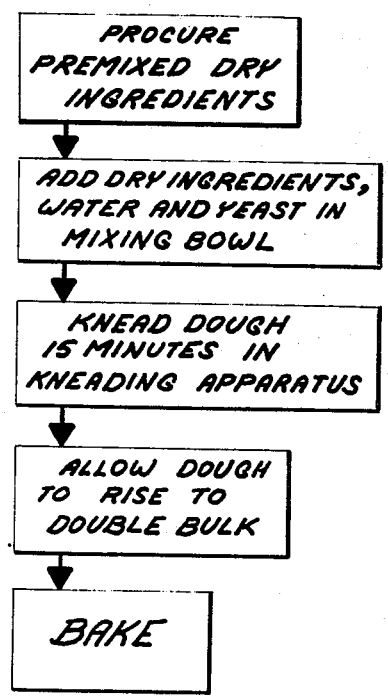
FIG. 6 is a flow chart of the improved method of making bread commercially.

In the figures the numeral 10 designates a generally rectangularly shaped base having a downwardly extending flange around the outer edge thereof for supporting the structure and an upwardly extending flange around the outer edge thereof adapted to receive the lower edge of a housing 11 in overlying engagement therewith. The housing 11 is generally box-shaped with side walls 12 and 13, front and back walls 14 and 15, respectively, and a top wall 16. A large three-sided generally rectangularly shaped depression 20 is formed approximately centrally in the housing 11. The depression 20 has a first side 21 parallel with and spaced from the side wall 12, a second side 22 parallel with and spaced from the side wall 13, and a third side 23 parallel with and spaced from the back wall 15. The three sides 21, 22 and 23 of the depression 20 are formed integral with the top wall 16 of the housing 11 and extend generally vertically downwardly to converge into an integral lower wall 24 parallel with and adjacent the base 10. All of the various outer walls of the housing 11 and sides of the depression 20 are formed integrally and with rounded corners so that there are no cracks or sharp corners to catch dirt and the entire structure is easy to keep clean. An L-shaped cover 30 is hingedly attached to the top wall 16 at the upper edge of the side 23 of the depression 20 so that the cover 30 forms a top and front wall for the depression 20 to completely enclose the same. The cover 30 is formed of plexiglass in the present embodiment so that it is unbreakable and transparent. It should be understood that the above-described embodiment of the base 10 and housing 11 is preferred because of its simplicity in construction and use but many other embodiments, which come within the scope of this invention, may be devised by those skilled in the art.

A motor 35 is mounted on the base 10 between the side wall 12 and the side 21 of the depression 20. A right-angle, drive unit 36 is fixedly engaged with the output shaft of the motor 35 and has an output shaft 37 directed towards the side 21 of the depression 20 and generally coaxial with an opening therethrough. The motor 35 is adapted to receive a suitable source of power through a switch 38 on the front wall 14 of the housing 11 and a timer 39 on the front wall 14 of the housing 11 may be connected to control the application of power to the motor 35 or may simply operate an indicator, such as a bell.

A socket-type connect and disconnect member 40 is fixedly attached to the output shaft 37 of the drive unit 36 by means of a set screw 41 (see FIG. 5) for rotation with the shaft 37. The member 40 is located adjacent the side 21, so that the socket is generally coaxial with the opening through the side 21, but the member 40 does not extend through the side 21. A kneading element generally designated 45 includes a U-shaped rod 46 with an elongated bight portion and generally parallel arms extending perpendicularly from the bight portion. The free ends of the arms have internally threaded outwardly directed openings therein. One end of a short connecting rod 47 is threadedly engaged in an opening in one end of the U-shaped rod 46 and the opposite end of the connecting rod 47 has threads 48 thereon adapted to matingly engage the socket of the member 40 attached to the output shaft 37. Threads 48 on the end of the connecting rod 47 are directed oppositely to the direction of rotation of the output shaft 37 so as to maintain the connecting rod 47 engaged in the socket of the member 40 during operation of the kneading element 45. A stanchion 50 is affixed to the base 10, approximately midway between the side wall 13 and the side 22 of the depression 20 in generally upwardly directed relationship and a bearing 51 is mounted thereon so as to be positioned approximately coaxial with the output shaft 37 and connecting member 40. An elongated support rod 52 is inserted through an opening in the side wall 13, through the bearing 51, through an opening in the side 22 and the inner end thereof is threadedly engaged in the opening of the adjacent arm of the U-shaped rod 46. The outer end of the support rod 52 has an enlarged circular handle portion 53 so that the support rod 52 can be easily disengaged from the U-shaped rod 46. Thus, the U-shaped rod 46 is mounted within the depression 20 for rotary movement about an axis through the ends of the arms thereof and parallel with the elongated bight portion. It should be understood that many innovations of the kneading element 45 may be devised by those skilled in the art and all such innovations which come within the scope of this invention are intended to be included herein.

A mixing bowl 60, having a generally semi-cylindrically shaped bottom and a rectangular top, has axially aligned openings in opposite sides thereof oriented approximately coaxially with respect to the semi-cyclindrically shaped bottom. To place the mixing bowl 60 in the depression 20, the U-shaped rod 46 is disengaged from the support rod 52 and the connecting member 40. The U-shaped rod 46 is then placed within the mixing bowl 60 so that the connecting rod 47 extends outwardly therefrom through one of the openings in a side thereof. The connecting rod 47 is engaged in the connecting member 40 and the support rod 52 is inserted through the opening in the opposite side of the mixing bowl 60 and threadedly engaged in the U-shaped rod 46. The mixing bowl 60 is now suspended from the connecting rod 47 and support rod 52 and the U-shaped rod 46 is positioned therein so that the bight thereof defines a cylinder during rotation which is concentric with the semi-cylindrical bottom of the mixing bowl 60 but with a slightly smaller radius. Further, the arms of the U-shaped rod 46 are adjacent the sides of the mixing bowl 60 but spaced slightly therefrom to allow free rotation of the U-shaped rod 46 within the mixing bowl 60.

The upper edges of the mixing bowl 60 are turned outwardly to form flanges therearound, which flanges normally engage outwardly projecting shoulders 61 (FIG. 4) formed in the sides of the depression 20 generally at the junctures of the sides 21 and 23 and the sides 22 and 23. Thus, the upper flange of the mixing bowl 60 and the shoulders 61 cooperate to prevent clockwise rotation of the mixing bowl 60 (as seen in FIG. 2) but allow counterclockwise rotation thereof. The motor 35 operates to turn the kneading element 45 in a clockwise direction (as seen in FIG. 2) so that the kneading element 45 will rotate freely within the mixing bowl 60 without producing rotation of the mixing bowl 60. However, the mixing bowl 60 is free to rotate in a counterclockwise direction so that the upper or open end thereof can be rotated toward the front of the housing 11 to remove dough therefrom without dismantling the entire machine.

The mixing bowl 60 is formed of a resilient material so that it will deform, with dough therein, as the U-shaped rod 46 rotates to provide a kneading action of the dough, which is very similar to the action used when manually or hand-kneading dough. As the kneading element 45 rotates, the bight of the U-shaped rod 46, which is oriented horizontally, engages dough in the mixing bowl 60 and produces a downward pressing action, because of the simultaneous deforming of the mixing bowl 60 similar to the forcing of the hand into the dough during manual kneading. Further, because of the deforming of the mixing bowl 60, there is no tendency for the kneading element 45 to shear or tear the dough apart, as in prior art mixers, but instead a continual firm kneading action occurs. This continual kneading and folding of the dough by the kneading element 45 within the mixing bowl 60 produces a dough having the quality and characteristics of homemade bread. In the present embodiment, the mixing bowl 60 is formed of a medium density polyethelene, one example of which is sold under the trade name "Dupont No. 8307," but it should be understood that other types of material might be utilized to form a mixing bowl having the necessary resiliency.

In the operation of the dough kneading apparatus, a special mixture of dry ingredients, including flour, sugar, shortening, milk powder and salt, is premixed in large quantities especially for the kneading or horizontal folding action peculiar to the above-described apparatus. For the size of machine presently being utilized, approximately eight pounds of the premixed dry ingredients are placed in the mixing bowl 60 and approximately 5 pounds of warm water and four ounces of yeast are added thereto. The switch 38 is operated to energize the motor 35 and the timer 39 to set to a desired time, in this example approximately 15 minutes. The apparatus forms the ingredients into a dough and kneads the dough in the horizontal folding action previously described. After approximately 15 minutes the machine is shut off and the cover 30 is rotated upwardly to provide access to the mixing bowl 60. The mixing bowl 60 is rotated so that the opening faces forwardly and the dough is removed therefrom. A second batch of dough can then be prepared if desired. The dough removed from the mixing bowl 60 is placed in a pan and allowed to rise until it has attained approximately double the original bulk. The dough is then removed and placed in individual bread pans and baked the required amount. Because of the kneading action of the above-described machine, the bread produced is similar in characteristics and taste to a hand-kneaded home-made bread and, because the kneading action is performed automatically by the above-described machine, the bread can be baked on a commercial or high production plane.

Thus, improved dough kneading apparatus capable of simulating hand-kneading on a commercial scale is disclosed which is simple to manufacture and operate. Further, because of the particular construction of the apparatus it is simple to dismantle and clean. In addition to the apparatus an improved method of producing a home-made style bread on a commercial scale is disclosed. While I have shown and described a specific embodiment of this invention, further modifications and improvements will occur to those skilled in the art. I desire it to be understood, therefore, that this invention is not limited to the particular form shown and I intend in the appended claims to cover all modifications which do not depart from the spirit and scope of this invention.

What is claimed is:

1. Improved dough kneading apparatus comprising:
   a. a base;
   b. a motor mounted on said base having an output shaft and adapted to operate upon proper energization thereof;
   c. a resilient mixing bowl having a generally semi-cylindrically shaped bottom;
   d. a kneading element having at least one generally horizontally extending rod mounted for rotation within said bowl approximately coaxial with the semi-cylindrically shaped bottom and with a slightly smaller radius than said bottom; and
   e. means removably connecting said kneading element to the output shaft of said motor for rotation therewith.

2. Improved dough kneading apparatus as set forth in claim 1 wherein the mixing bowl is constructed of a medium density polyethelene.

3. Improved dough kneading apparatus as set forth in claim 1 wherein the kneading element is a generally U-shaped rod having means adjacent each end for rotatably mounting said rod.

4. Improved dough kneading apparatus as set forth in claim 1 including in addition a bearing mounted coaxial with and spaced from the output shaft of the motor, an integrally threaded opening is provided in the kneading element coaxial with and on an opposite side from the axially extending rod, and an elongated rod threaded at one end is rotatably positioned in the bearing and threadedly engaged in said opening.

* * * * *